United States Patent [19]
Honaker, Jr.

[11] Patent Number: 5,689,530
[45] Date of Patent: Nov. 18, 1997

[54] DATA RECOVERY CIRCUIT WITH LARGE RETIME MARGIN

[75] Inventor: Charles M. Honaker, Jr., Garland, Tex.

[73] Assignee: Alcatel Network Systems, Inc., Richardson, Tex.

[21] Appl. No.: 520,034

[22] Filed: Aug. 28, 1995

Related U.S. Application Data

[63] Continuation of Ser. No. 263,555, Jun. 22, 1994, abandoned.

[51] Int. Cl.[6] .................. H04L 25/34; H04L 25/49
[52] U.S. Cl. .................. 375/286; 341/68; 375/359
[58] Field of Search .................. 375/371, 375, 375/372, 376, 354, 293, 294, 326, 327, 286, 359, 360; 341/68, 69; 327/141, 144, 147

[56] References Cited

U.S. PATENT DOCUMENTS

| | | | |
|---|---|---|---|
| 4,635,277 | 1/1987 | Blake et al. | 375/20 |
| 4,700,084 | 10/1987 | Honaker, Jr. | 307/269 |
| 4,713,621 | 12/1987 | Nakamura et al. | 328/55 |
| 4,819,251 | 4/1989 | Nelson | 375/119 |
| 4,868,513 | 9/1989 | Piercy et al. | |
| 4,947,394 | 8/1990 | Nakajima et al. | 371/20.1 |
| 4,961,206 | 10/1990 | Tomlinson et al. | 375/373 |
| 5,022,056 | 6/1991 | Henderson et al. | 375/373 |
| 5,056,118 | 10/1991 | Sun | 375/106 |
| 5,073,905 | 12/1991 | Dapper et al. | 375/354 |
| 5,220,581 | 6/1993 | Ferraiola et al. | 370/108 |
| 5,276,712 | 1/1994 | Pearson | 375/110 |
| 5,412,311 | 5/1995 | Rothermel | 327/7 |

*Primary Examiner*—Tesfaldet Bocure
*Assistant Examiner*—Bryan Webster
*Attorney, Agent, or Firm*—Vinson & Elkins L.L.P.

[57] ABSTRACT

A circuit for recovering a clock signal from incoming data and for retiming the incoming data comprises circuitry for generating a plurality of phased clock signals responsive to a selected frequency and clock recovery circuitry for generating a recovered clock from the plurality of phased clocks and the incoming data. The recovered clock is used to retime the data, which may be either RZ or NRZ data. To recover clock from the incoming data, the presence of a logic "1" is detected in one or more data streams and the phase of the data relative to the phased clocks is determined. Hold circuitry stores the phase information during the interval between logic "1" bits and aligns the phase information with the leading phased clock. Compare circuitry and counter circuitry detect changes in phase information to insure that a change is not merely the result of a metastable anomaly. Phase control circuitry uses phase information from the compare block to switch between phased clocks to generate the glitchless recovered clock. The recovered clock is used by the data retime circuitry to retime the data with the recovered clock. A multi-tap delay line can be used to generate a plurality of phased clock signals from a selected data frequency, with the clock recovery circuitry using a predetermined number of the plurality of phased clocks to generate the recovered clock responsive to the frequency of the incoming data.

16 Claims, 13 Drawing Sheets

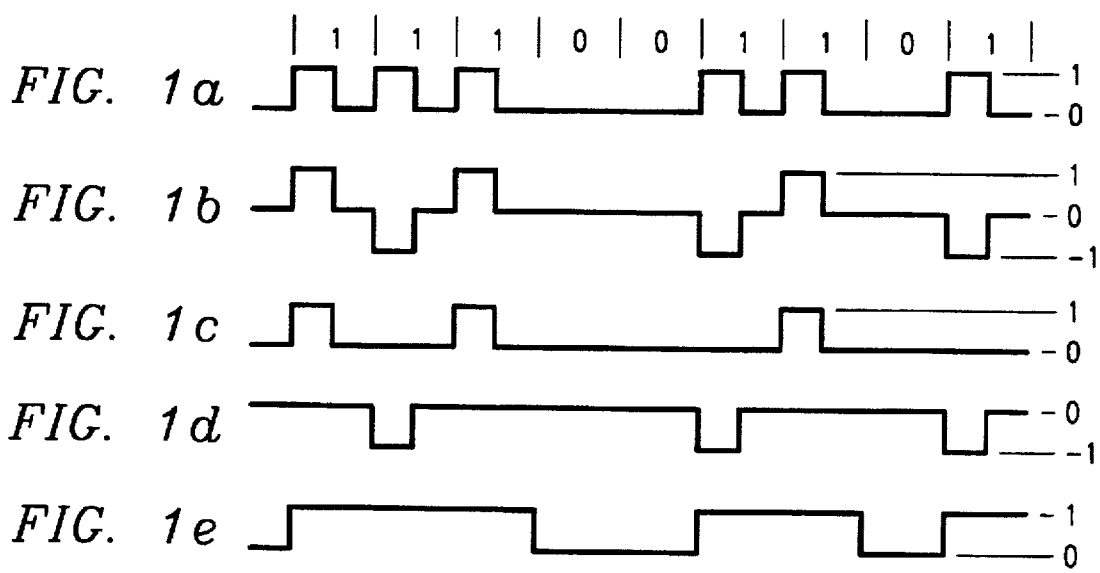
FIG. 1a
FIG. 1b
FIG. 1c
FIG. 1d
FIG. 1e
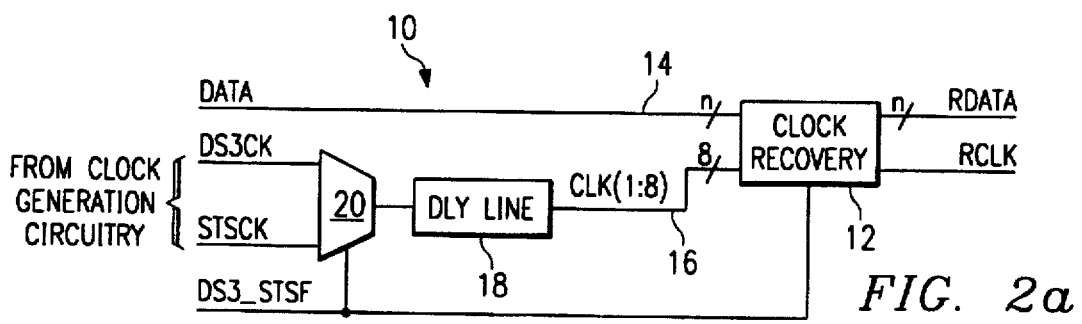
FIG. 2a
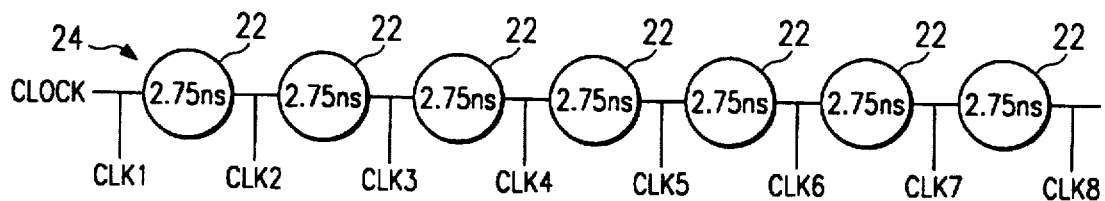
FIG. 2b
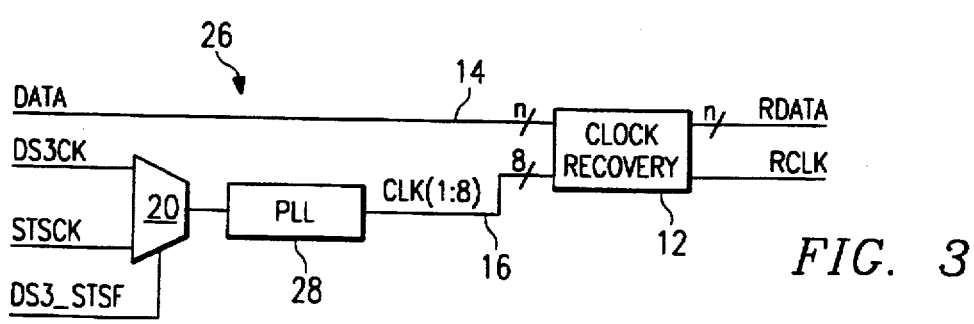
FIG. 3

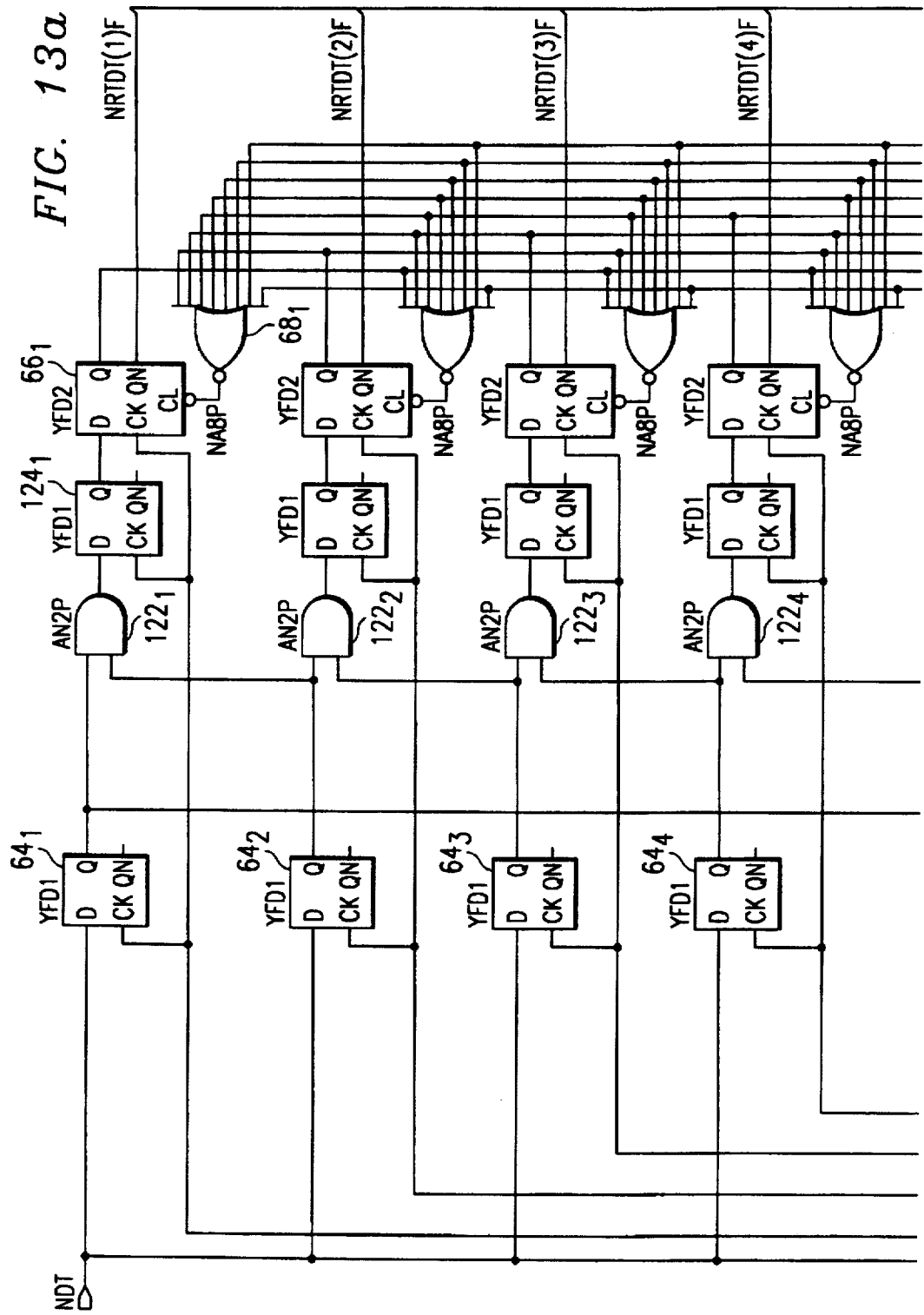

DATA RECOVERY CIRCUIT WITH LARGE RETIME MARGIN

RELATED APPLICATIONS

This application is a Continuation of application Ser. No. 08/263,555, filed Jun. 22, 1994, and entitled "Data Recovery Circuit with Large Retime Margin", now abandoned.

TECHNICAL FIELD OF THE INVENTION

This invention relates in general to telecommunication circuits, and more particularly to a circuit for recovering a clock signal in a telecommunication circuit.

BACKGROUND OF THE INVENTION

In area of telecommunications, signals are sent between devices for long distances over communication cables and/or fibers. These signals are not accompanied by a clock signal; hence, the device receiving the data signal must generate its own clock (known in the art as "clock recovery"). This clock is used to retime the incoming signal.

Typically, data is transmitted between devices as return-to-zero ("RZ") data. With RZ data, a logic "1" data pulse returns to zero prior to the end of a clock period, as shown in FIG. 1a. In the telecommunications industry, RZ data typically returns to zero halfway through a Clock period. Additionally, for telecommunications, RZ data is typically transmitted in a bipolar form, shown in FIG. 1b, where a logic "1" may be of positive or negative polarity. Usually, the bipolar signal is split into positive and negative data, shown in FIGS. 1c and 1d, at the receiving portion of the system. Clock recovery can be performed before or after the positive and negative data is recombined. Clock recovery is typically performed prior to operations such as B3ZS decoding, bipolar violations, and similar operations, such that these operations can be performed synchronously.

A second data form is non-return-to-zero (NRZ) data. With NRZ data, a logic "1" data pulse does not return to zero at any time during the period, as shown in FIG. 1e. NRZ data types are most commonly found internal to the device. Because NRZ data is not suited for long distance transmission, it is rarely transmitted between devices, with the exception of a fiber-optic transmission system. In most cases, NRZ data contains all of its information in a single data stream; however, there may be cases in which NRZ data may be split into more than one data streams.

One prior art clock recovery circuit uses a resonant (ringing tank) clock circuit to generate a clock signal in response to receive data. Ringing tank circuits present several problems. First, in order to maintain the circuit in a "ringing" condition, a minimum repetition rate of data pulse is necessary. Further, ringing tank circuits are subject to temperature variations which may result in a drift in frequency. In order to maintain the circuits, a considerable amount of testing and adjusting is necessary to keep the ringing tank tuned to the appropriate frequency.

A second clock recovery circuit uses an analog phase-locked loop (PLL). These devices present the usual problems of imprecision of a analog circuit relative to digital techniques. Accordingly, a number of digital PLL circuits have been proposed for clock recovery. One of these is shown in U.S. Pat. No. 4,819,251 to Nelson. In this patent, a digital clock recovery circuit is presented which uses a delay line to produce a plurality of delayed sample signals, which are then used to sample incoming data in a phase detector. The resultant sample data is then resampled by the tentatively correct apparatus clock output signal. The resampled data provides a direct indication of the phase difference between the data and the clock and the value can be obtained using a summing circuit. If the summed amount is outside an allowable range of values, a phase altering signal is applied to an oscillator to change the phase of the apparatus clock output signal. While circuits such as these overcome some of the problems associated with analog clock recovery circuits, such as precision tuning of the VCO or VCXO, phase adjustments, high cost and the need to use precision analog parts, these digital clock recovery circuits are not suited to clock recovery from RZ data and/or require high frequency clock sources in order to operate.

In some situations, it is highly desirable to recover a clock from signals of two different frequencies. DS3 and STS-1 signals, for example, are almost identical in their transmitted Characteristics, each being RZ bipolar signals which return to zero halfway through the period. The DS3 has a nominal frequency of 44.736 MHz, while the STS-1 has a nominal frequency of 51.84 MHz. Since both of these signals occupy equivalent levels in the telecommunications hierarchy, it will be common for a particular piece of equipment to accommodate both types of data. Consequently, a clock recovery circuit which can recover a clock from both types of signals would be a great benefit to avoid duplicate circuitry for each type of signal. Heretofore, prior art clock recovery devices do not easily switch between signals of different frequencies.

Therefore a need has arisen in the industry for an accurate clock recovery system, which is capable of handling multiple frequency input signals, has a large retime margin, and is capable of handling both RZ and NRZ data inputs.

SUMMARY OF THE INVENTION

In one aspect of the present invention, data is recovered from an RZ data stream by recovering a clock signal from said data stream, translating said RZ data stream to an NRZ data stream and retiming the NRZ data stream with the recovered clock signal. In one embodiment of the invention, circuitry for sampling the RZ data stream for generating the recovered clock is also used to generate the NRZ data stream.

The present invention provides significant advantages over the prior art, since the larger period in which to sample the NRZ data stream provides twice the margin to retime the signal, since a high logic level pulse in the NRZ data stream will not return to zero in the second half of its period. Thus, a higher accuracy may be obtained.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1a–e illustrate timing diagrams showing examples of RZ, bipolar RZ, RZ-P, RZ-N, and NRZ signals;

FIG. 2a illustrates a first embodiment of a circuit for recovering a clock signal from received data and retiming the received data;

FIG. 2b illustrates a multitap delay line for use in the circuit of FIG. 2a;

FIG. 3 illustrates a second embodiment of a circuit for recovering a clock signal from received data and retiming the data;

FIGS. 13a–13b illustrates an alternative embodiment for the N-DET circuitry of FIG. 7

DETAILED DESCRIPTION OF THE INVENTION

Figure 4:
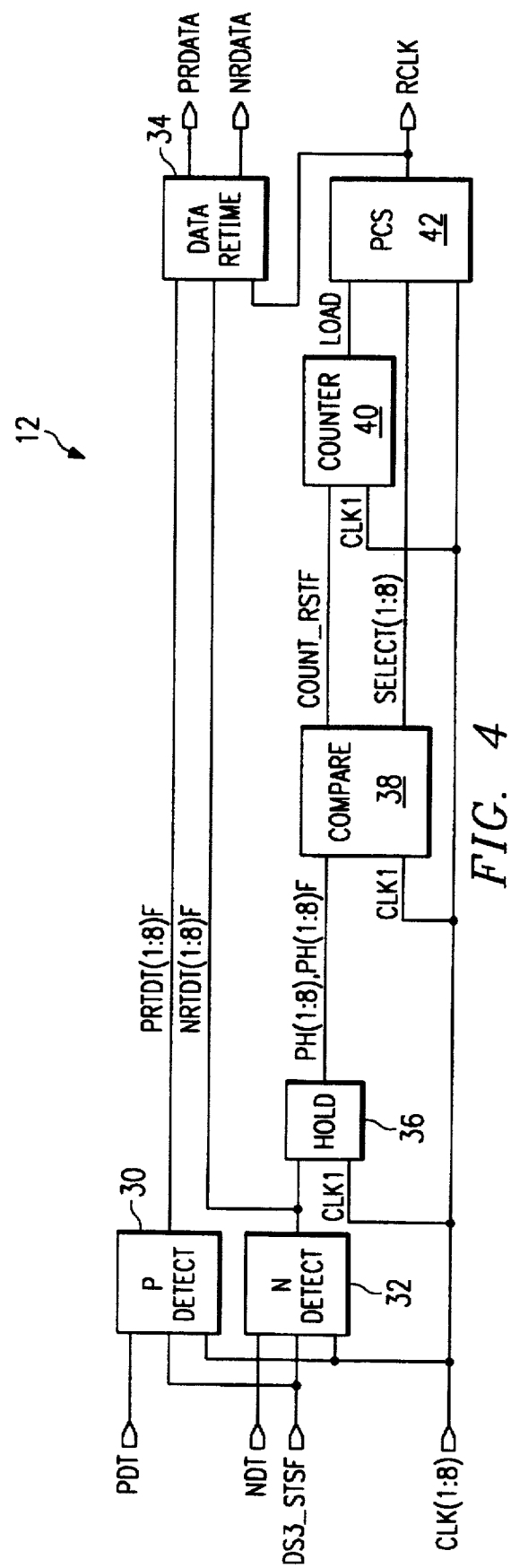
FIG. 4 illustrates a block diagram of the clock recovery circuitry used in the circuits of FIGS. 2a and 3.

FIGS. 2a–b and 3 illustrate first and second embodiments of a circuit for recovering a clock signal from incoming data and for retiming the incoming data with the recovered clock. In the first embodiment, shown in FIG. 2a, a circuit 10 comprises a clock recovery circuit 12 coupled to data lines 14 and a plurality of phased clocks on lines 16. The clocks (CLK1–CLK8) are generated by delay line circuitry 18, which is coupled to a clock (shown in FIG. 1 as either a DS3 or STS-1 clock) selected by control signal DS3 _STSF through multiplexer 20. The control signal DS3 _STSF is also coupled to the clock recovery circuitry 12. The clock recovery circuitry 12 outputs the recovered clock (RCLK) and the recovered data (RDATA).

Generation of the clocks corresponding to DS3 and STS-1 data types is well known in the art. Other clock frequencies could be provided as well, where appropriate.

In this embodiment, phased clocks are generated using an 8-tap fixed delay line 18, shown in greater detail in FIG. 2b. At each tap 22 of the delay line 24, the reference clock (the output of multiplexer 20) is delayed an additional 2.75 nanoseconds (for the embodiment shown using DS3 or STS-1 data). All eight clock lines (CLK1–CLK8 ) are input to the clock recovery circuit 12 via lines 16. As described hereinbelow, the clock recovery circuit 12 uses the clocks output from delay line 18 to generate the RDATA and RCLK signals. When recovering a clock from DS3 data, a DS3 clock reference (i.e., a 44.736 MHz signal) is input to the delay line 24 and all eight phased clocks are used in the clock recovery circuit 12. On the other hand, when recovering a clock from STS-1 data, an STS-1 clock reference (i.e., a 51.84 MHz clock signal) is input into the delay line 18 and seven of the eight phased clocks are used by the clock recovery circuit 12. The decision whether to use seven or eight phase clocks is controlled by the DS3 _STSF control signal).

FIG. 3 illustrates a block diagram of a circuit 26 which comprises a second embodiment of the circuit for clock recovery and data retime. This embodiment is identical to the embodiment shown in FIG. 2a, with the exception that a phase-locked loop 28 is used to lock onto the output of multiplexer 20. In the preferred embodiment, there are two types of phase-locked loop circuits which may be used to implement PLL 28. The first type of phase-locked loop circuit using a VCO frequency that is approximately eight times the frequency of the recovered clock. The output of the phase-locked loop is then divided by eight using a Johnson counter. The Johnson counter provides the eight phased clocks which are input to the clock recovery circuit 12. One known disadvantage of this type of circuit is the possible undesirable effects due to the high frequency of the PLL 28, if the PLL 28 is located on the printed circuit board. The PLL 28 could be located, however, within the same device that contains the clock recovery circuit 12. In this situation, the negative effects of the high frequency VCO can be contained within the device.

A second type of PLL would use a VCO frequency which is about the same frequency as the data. This type of VCO would use a voltage controlled ring oscillator that is tapped at eight equidistant points around the ring. The eight taps would serve as the eight phased clocks to be input to the clock recovery circuit 12.

FIG. 4 illustrates a block diagram of the clock recovery circuit 12. Data is received into the clock recovery circuit 12 as PDT (positive data) and NDT (negative data). The PDT signals would be, for example, the positive RZ signals shown in FIG. 1c, while the NDT signals would be the negative RZ signal's shown in FIG. 1d after inversion. It should be noted that the PDT (and NDT) data signals could be NRZ data as well. The PDT signals are input to positive level detection circuitry 30 (hereinafter P_DET circuitry 30). The NDT signals are input to negative detection circuitry 32 (hereinafter N_DET circuitry 32). The DS3 _STSF control signal is input to P_DET circuitry 30 and N_DET circuitry 32, as are eight clocks generated by the delay line 18 or PLL 28. The P_DET circuitry 30 outputs positive retime data (inverted) PRTDT(1:8)F to data retime circuitry 34. Similarly, N_DET circuitry 32 outputs negative retime data (inverted) NRTDT(1:8)F to data retime circuitry 34. NRTDT(1:8)F is also input to hold circuitry 36, along with the first clock (CLK1) from delay line circuitry 18 or PLL circuitry 28. The output of the hold circuitry 36 is phase data PH(1:8) and PH(1:8)F (the inverted PH(1:8) data), which is received by compare circuitry 38, along with the CLK1 signal. The compare circuitry 38 outputs a control signal, COUNT_RSTF, to counter circuitry 40 and SELECT(1:8) signals to phase controlled selector circuitry 42 (hereinafter PCS 42). PCS 42 also receives a control signal LOAD from counter 40 and the eight phased clock signals CLK(1:8). The output of PCS 42 is the recovered clock signal RCLK which is input to the data retime circuit 34. The data retime circuit 34 outputs signals PRDATA and NRDATA, which are the retimed PDT and NDT signals, respectively.

Figure 5:
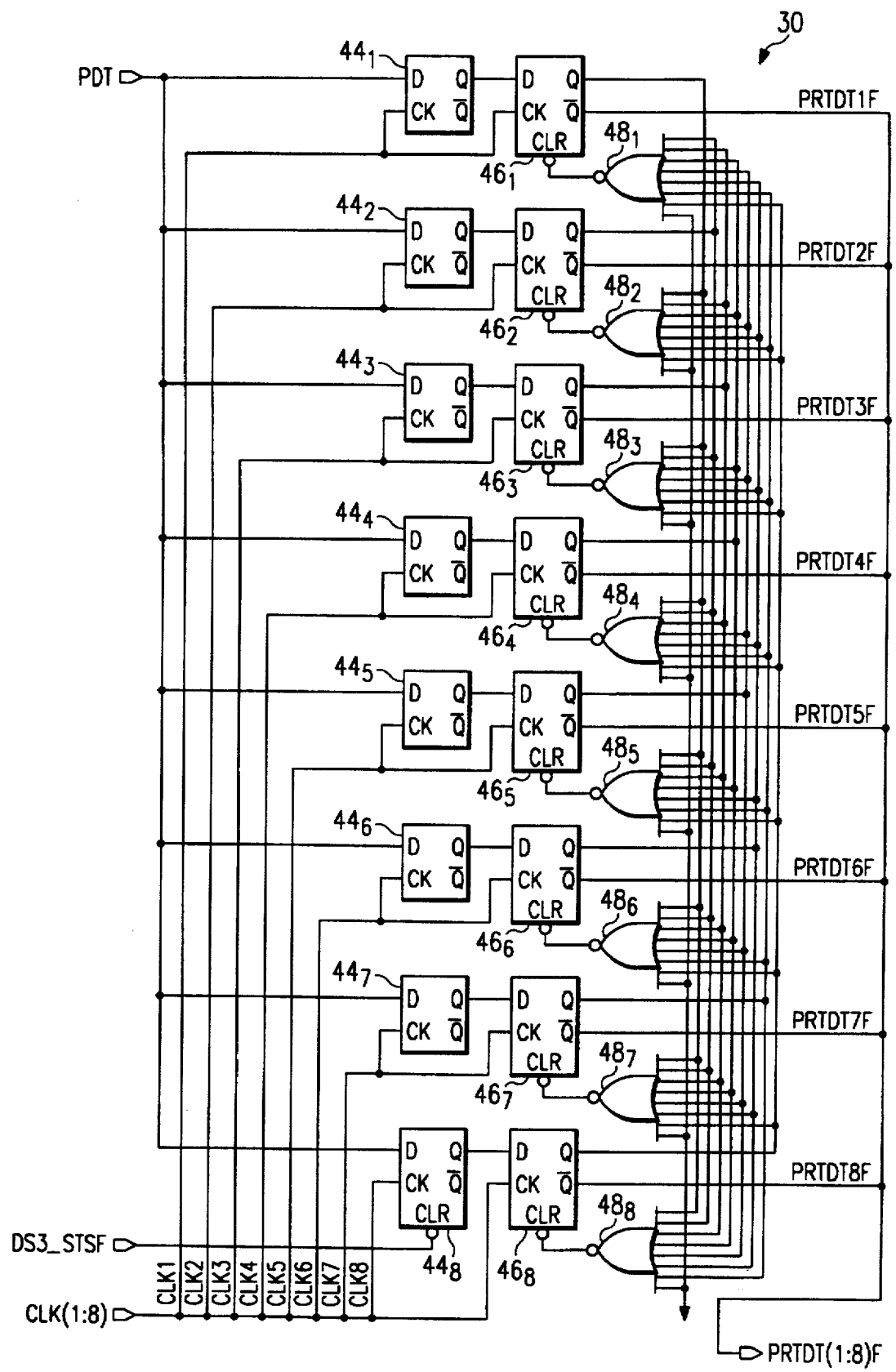
FIG. 5 illustrates a schematic representation of the P_DET circuitry used in the clock recovery circuit of FIG. 4.

The P_DET circuitry 30 is shown in greater detail in connection with FIG. 5. The PDT signal is input to eight flip-flops $44_1$–$44_8$. Respective clock signals, CLK1–CLK8, are coupled to the clock input of the flip-flops $44_1$$44_8$. The non-inverted output (Q) of each flip-flop $44_1$–$44_8$ is coupled to the input to a second stage flip-flop $46_1$–$46_8$. Clocks CLK1–CLK8 are input to the clock input of respective flip-flops $46_1$–$46_8$. A plurality of NOR gates $48_1$–$48_8$ have their outputs connected to the clear (CL) input of the respective flip-flops $46_1$–$46_8$. Each NOR gate $48_1$–$48_8$ has as its inputs the non-inverted outputs of each flip-flop $46_1$–$46_8$, except the flip-flop to which its outputs is coupled. Hence, NOR gate $48_1$ has as its inputs the non-inverted outputs of flip-flops $46_2$–$46_8$. Similarly, NOR gate $48_2$ has as its inputs the non-inverted outputs of flip-flops $46_1$ and $46_3$–$46_8$. The inverted output of each flip-flop $46_1$–$46_8$ is the PRTDT(n)F signal. Hence, the inverted output of flip-flop $46_1$ is the PRTDT1F signal and the inverted output of flip-flop $46_2$ is the PRTDT2F signal. The DS3 _STSF control signal is coupled to the clear input of flip-flop $44_8$.

In operation, the P_DET circuitry 32 has two functions. The first function is that of a phase detector which identifies the first clock (CLK1–CLK8) to detect a logic high signal. The second function is to convert positive RZ data (assuming the input is RZ data) into positive NRZ data.

Figure 6:
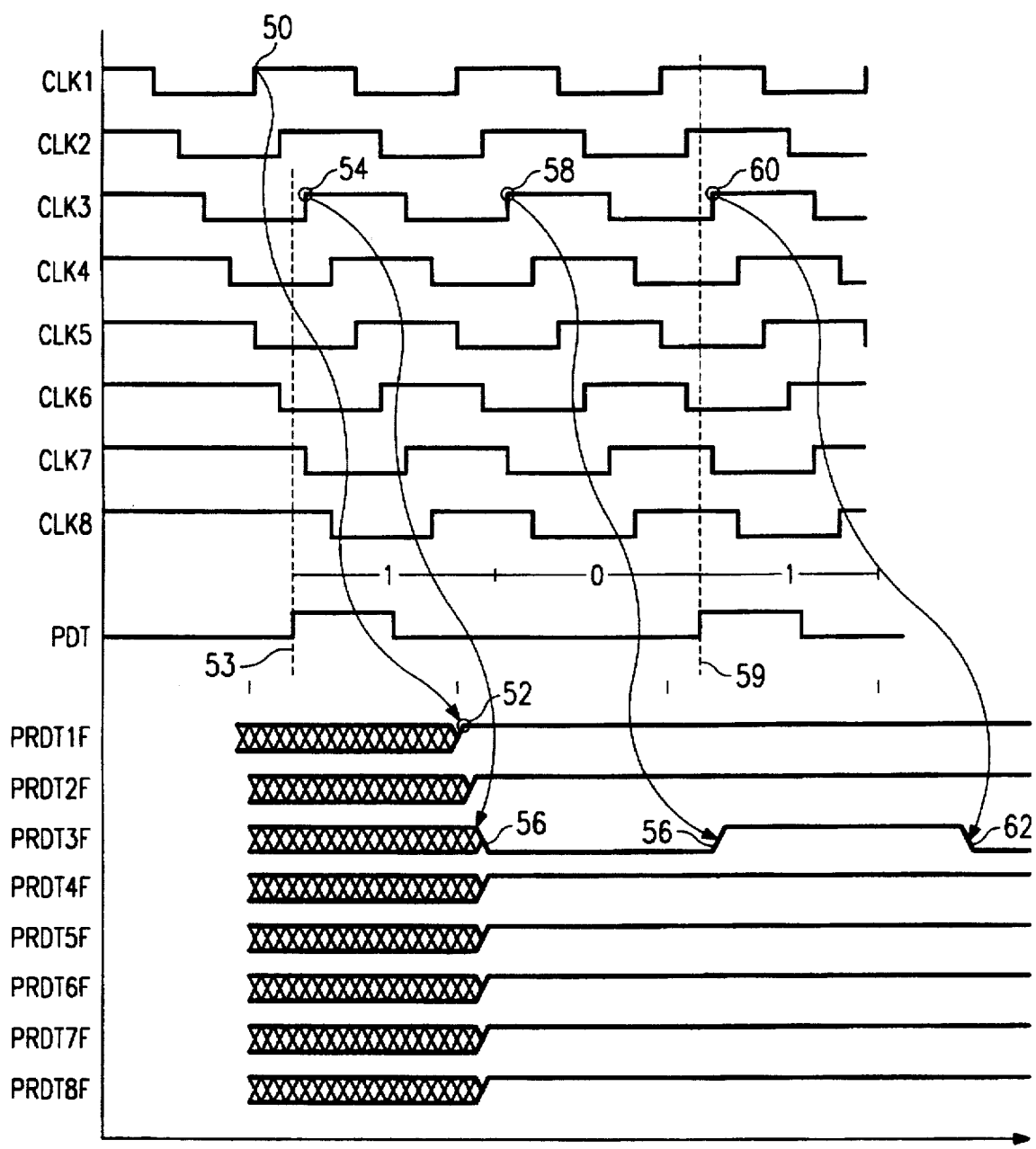
FIG. 6 illustrates a timing diagram illustrating operation of the P_DET circuitry of FIG. 5.

The operation of the P_DET circuitry 30 is best understood in relation to FIG. 6, which shows a sample data stream PDT and the resultant output signals PRDT(1:8)F. The flip-flops $44_1$–$44_8$ latch their input on the rising edge of the respective clock signal. Hence, at point 50, (shown on the CLK1 timing diagram) the PDT signal is low and, hence, a zero is latched at the non-inverting output of flip-flop $44_1$. On the next low-to-high transition of CLK1, the zero is propagated to the non-inverting output of flip-flop $46_1$, is shown at point 52 of the PRDT1F signal. The two flip-flops $44_1$ and $46_1$, in series, provide conditioning against metastable anomalies that invariably occur in an asynchronous apparatus.

Each pair of flip-flops $44_n$ and $46_n$ thus sample the PDT data (twice for metastability considerations). The first pair of flip-flops to detect logic "1" in the data stream disables all of the other flip-flop pairs by activating the clear (reset) pins of the second flip-flop ($46_n$) of the pair. Referring again to. FIG. 6, at point 54, CLK3 detects a logical high value 53 on the PDT signal. Hence, at point 56, the PRDT3F signal goes low. When the PRDT3F goes low, NOR gates $48_1$–$48_2$ and $48_4$–$48_8$ each output a logic "0" which resets the respective flip-flops $46_1$–$46_2$ and $46_4$–$46_8$. The flip-flops remain in the reset state until PRDT3F transitions to a logical high at point 56 (responsive to detection of a low value on the PDT signal at point 58). At this point, all flip-flops $46_1$–$46_8$ resume the sampling function. As shown at points 60 and 62, the CLK3 signal also detects a logical high 59 on the PDT signal at point 60, resulting in a high-to-low transition of the PRDT3F signal at point 62, which resets the other flip-flops $46_1$–$46_2$ and $46_4$–$46_8$.

When the DS3 STSF input is in the logic "1" state, the P_DET circuitry 30 operates in conjunction with all eight clocks, CLK(1:8). When the DS3 _STSF control signal is in the logic "0" the P_DET circuitry 30 uses only seven of the eight phases of the clock, i.e., CLK(1:7). This allows for clock recovery of two different frequencies, in this case, a DS3 signal and a STS-1 signal. In order to use the seven phase operation of the P_DET, the phase clocks should be generated using a fixed, eight tap delay line which is external to the device. For the given example, each tap of the delay line should have a delay of approximately 2.75 nanoseconds. Thus, when a 44.736 MHz clock is input into the delay line, all eight phased clocks are used in the P_DET circuitry 30, a clock can be recovered from DS3 data. Likewise, when a 51.84 MHz clock is input into the delay line and only seven phases are used in the P_DET circuitry 30, the clock can be recovered from STS-1 data. In either case, the phased clocks are substantially equally spaced apart in terms of phase shift. It should be noted that other alternatives are possible. For example, if an 8X clock is divided by a Johnson divide-by-eight counter, eight equidistant phases are created. In this example, the full eight phases are used to perform clock recovery. Different clock frequencies can be recovered by changing the frequency of the 8X clock.

Figure 7:
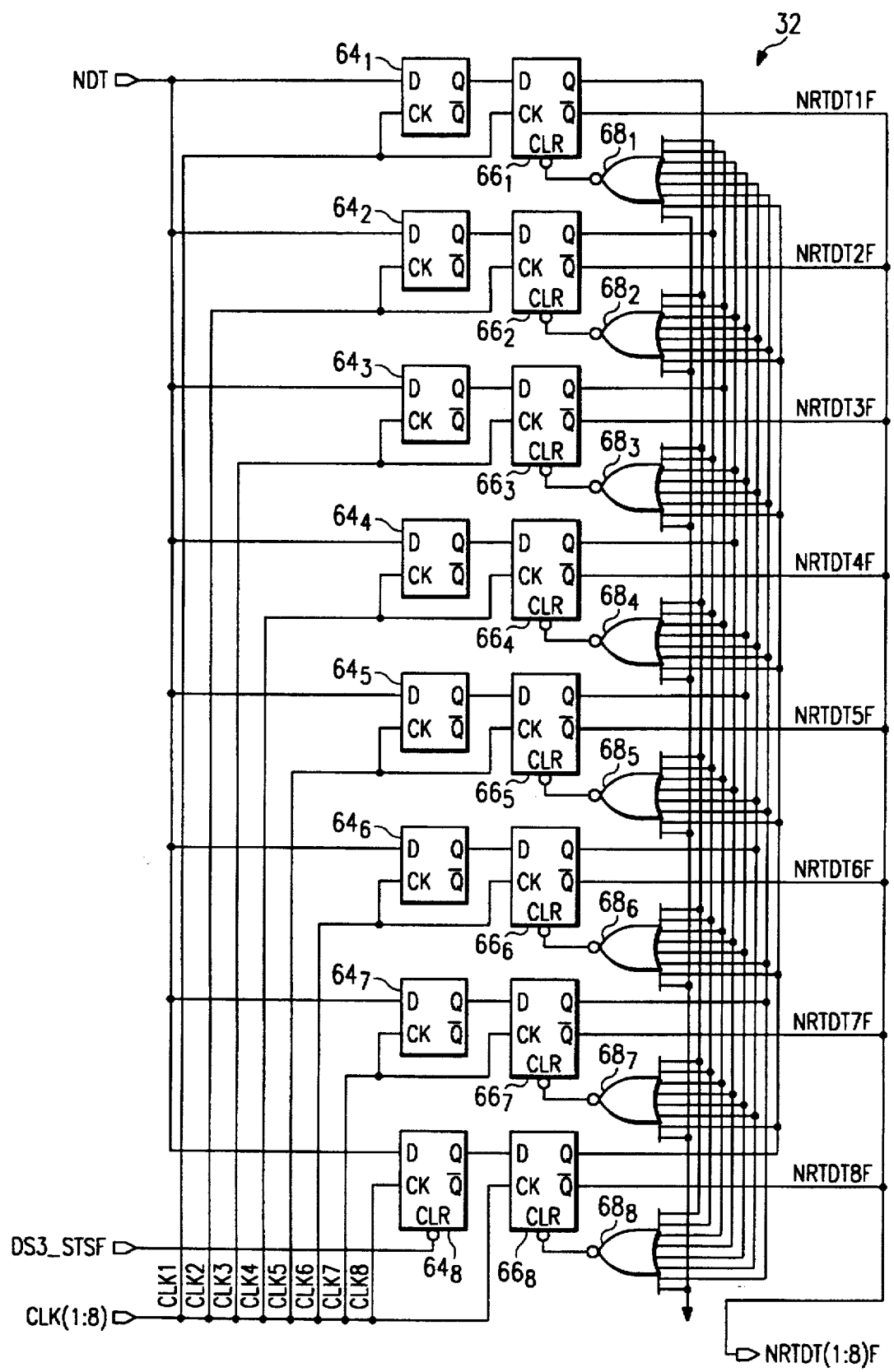
FIG. 7 illustrates a schematic representation of the N_DET circuitry used in the clock recovery circuit of FIG. 4.

The N_DET circuitry 32 is illustrated in FIG. 7. The NDT signal is input to eight flip-flops $64_1$–$66_8$. Respective clock signals, CLK1— CLK8, are coupled to the clock input of the flip-flops $64_1$–$66_8$. The non-inverted output of each flip-flop $66_1$–$66_8$ is coupled to the input to a second stage, flip-flop $66_1$–$66_8$. Clocks CLK1–CLK8 are input to the clock input of respective flip-flops $66_1$–$66_8$. A plurality of NOR gates $68_1$–$68_8$ have their outputs connected to the clear (CL) input of the respective flip-flops $66_1$–$66_8$. Each NOR gate $68_1$–$68_8$ has as its inputs the noninverted outputs of each flip-flop $66_1$–$66_8$, except the flip-flop to which its output is coupled. Hence, NOR gate $68_1$ has as its inputs the noninverted outputs of flip-flops $66_2$— $66_8$. Similarly, NOR gate $68_2$ has as its input the noninverted output of flip-flops $66_1$ and $66_3$–$66_8$. The inverted output of each flip-flop $66_1$–$66_8$ is the NRTDT(n)F signal. Hence, the inverted output of flip-flop $66_1$ is the NRTDT1F signal and the inverted output of flip-flop $66_2$ is the NRTDT2F signal.

The purpose of the N_DET circuitry 32 is similar to that illustrated in connection with FIGS. 5–6 for the P_DET circuitry 30. The N_DET circuitry 32 detects the presence of a logic "1" in the NDT data stream and finds the phase relationship between the incoming data and the phased clocks CLK1–CLK8 (or CLK1–CLK7 if DS3 _STSF="0"). N_DET circuitry 32 also provides conditioning against metastable anomalies. As with the P_DET circuitry 30, the N_DET circuitry 32 determines which phase clock CLK (1:8) retimes a logic "1" first from the NDT data stream. This is accomplished by allowing each phase clock to sample the data (twice for metastability considerations). The first sample operation to detect a logic "1" in the data stream disables all of the other sampling operations by activating their reset pins. The reset pins are held in the active state until a logic "0"is detected in the NDT data stream. This operation is repeated every time there is a low-to-high transition in the NDT data stream.

When the DS3 _STSF input is in the logic "1" state, the N_DET circuitry 32 operates with all eight phase clocks. When the DS3 _STSF control signal is in the logic "0" state, the N_DET circuitry 32 uses only seven of the eight phases of the clock. This allows for clock recovery of two different frequencies, as discussed in greater detail in connection with the P_DET circuitry 30.

Figure 8:
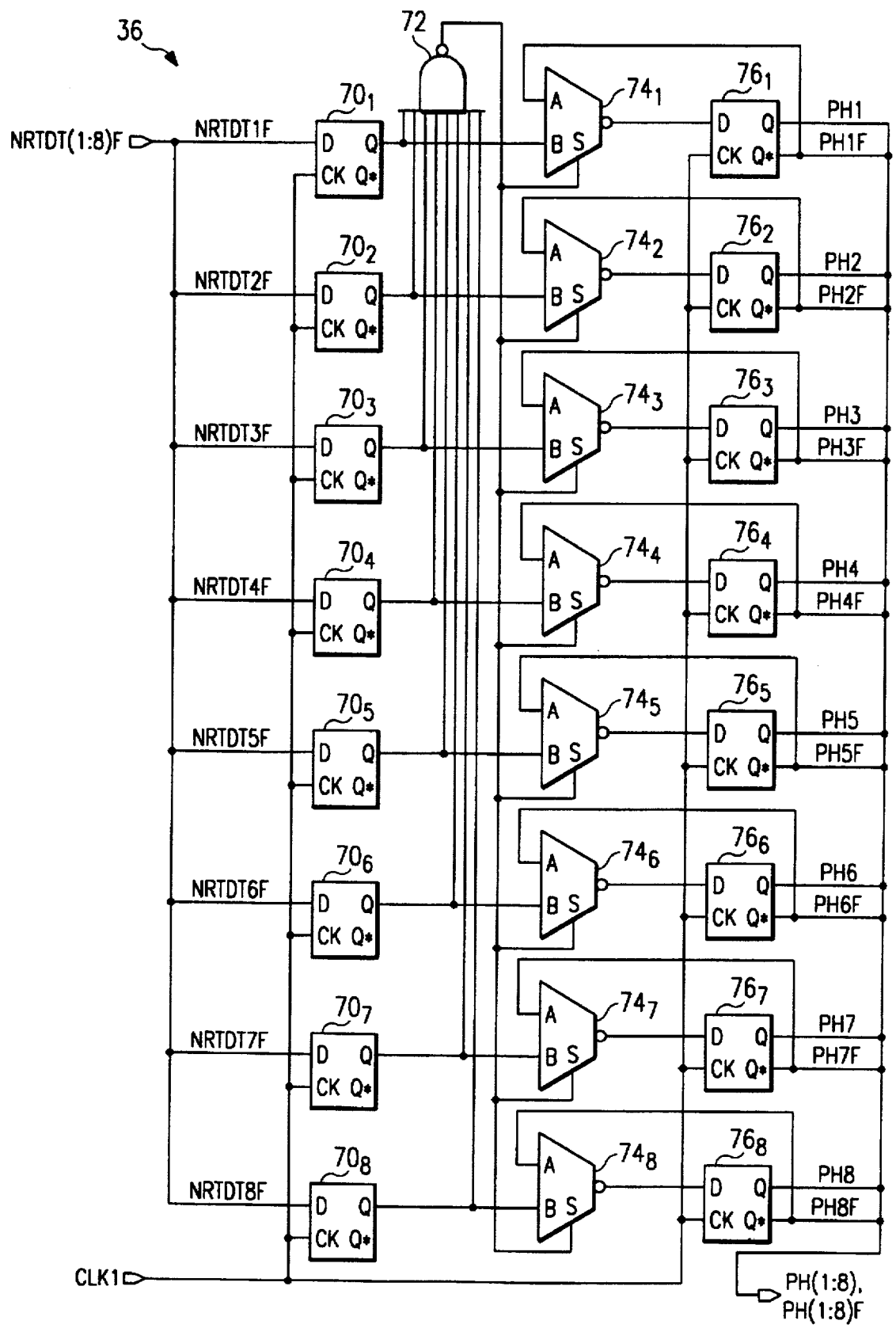
FIG. 8 illustrates a schematic representation of the hold circuitry used in the clock recovery circuit of FIG. 4.

The hold circuitry 36 is illustrated in FIG. 8. The hold circuitry receives the NRTDT(1:8)F signals from the N_DET circuitry 32. A first bank of flip-flops $70_1$–$70_8$ receive respective NRTDT(N)F signals. Hence, flip-flop 701 receives the NRTDT1F signal and flip-flop 702 receives the NRTDT2F signal. Each flip-flop $70_1$–$70_8$ is clocked using the CLK1 phased clock. The outputs of the flip-flops $70_1$–$70_8$ are connected to the inputs of a NAND gate 72. The output of NAND gate 72 is coupled to the select input of multiplexers $74_1$–$74_8$. The inverting outputs of multiplexers $74_1$–$74_8$ are coupled to respective inputs of flip-flops $76_1$–$76_8$. The inverted outputs of flip-flops $76_1$–$76_8$ are coupled to the A inputs of respective multiplexers $74_1$–$74_8$. The B input of multiplexers $74_1$–$74_8$ are connected to respective NRTDT(1:8)F signals. Hence, the B input of multiplexer $74_1$ is coupled to NRTDT1F through flip-flop $70_1$ and the B input of multiplexer $74_2$ is connected to NRTDT2F through flip-flop $70_2$. Flip-flops $76_1$–$76_8$ are clocked by the CLK1 signal. The non-inverted output of the flip-flop $76_1$ is the PH(n) signal and the inverted output of flip-flops $76_1$–$76_8$ is the PH(n)F signal. For example, flip-flop $76_1$ outputs the PH1 and PH1F signals.

In operation, the hold circuitry 36 stores new phase information during the interval between logic "1" bits on the NDT signal. The hold circuitry 36 aligns the incoming phase information with the leading phase clock (CLK1) and holds the new phase information during the time between logic "1" bits. By retiming the incoming phase information from the N_DET circuitry 32 using the leading the phase clock (CLK1), the phase information is aligned so that other operations can be conducted synchronously. The retiming function is performed by flip-flops $70_1$–$70_8$. After the phase information is aligned, the hold circuitry determines whether a logic "1" or a logic "0" has been detected. If a logic "0" has been detected, the non-inverted output of all flip-flops $70_1$–$70_8$ will be "1" resulting in an output of "0" from the NAND gate 72. When the NAND gate 72 outputs a logic "0" the multiplexer passes the previous phase information from the outputs of flip-flops $76_1$–$76_8$. If a logic "1" is detected, the multiplexers pass the output of the flip-flops $70_1$–$70_8$ to flip-flops $76_1$–$76_8$, respectively, thereby updating the phase information.

Figure 9A:
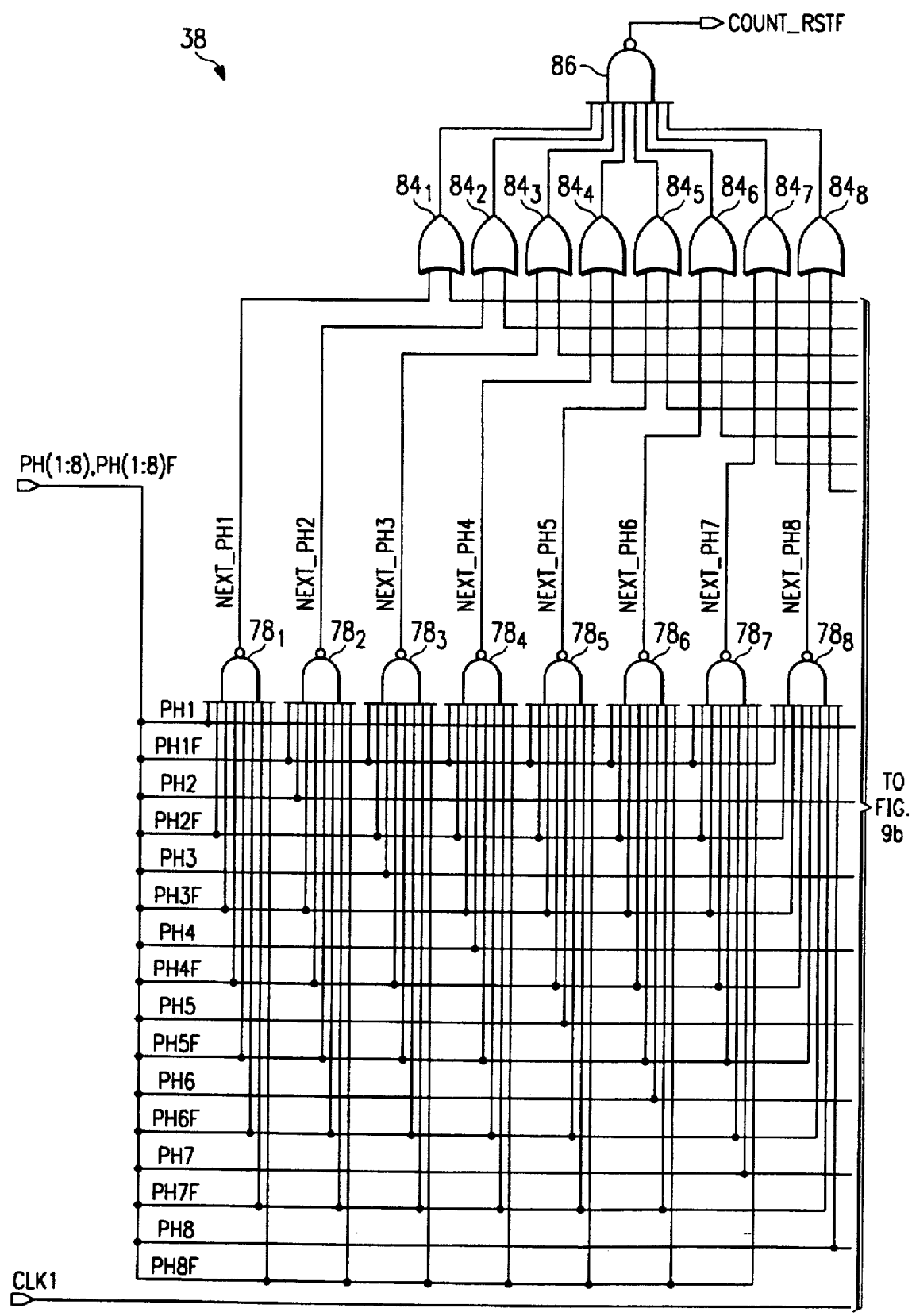
FIGS. 9a–b illustrate the compare circuitry used in the clock recovery circuitry of FIG. 4.
Figure 9B:
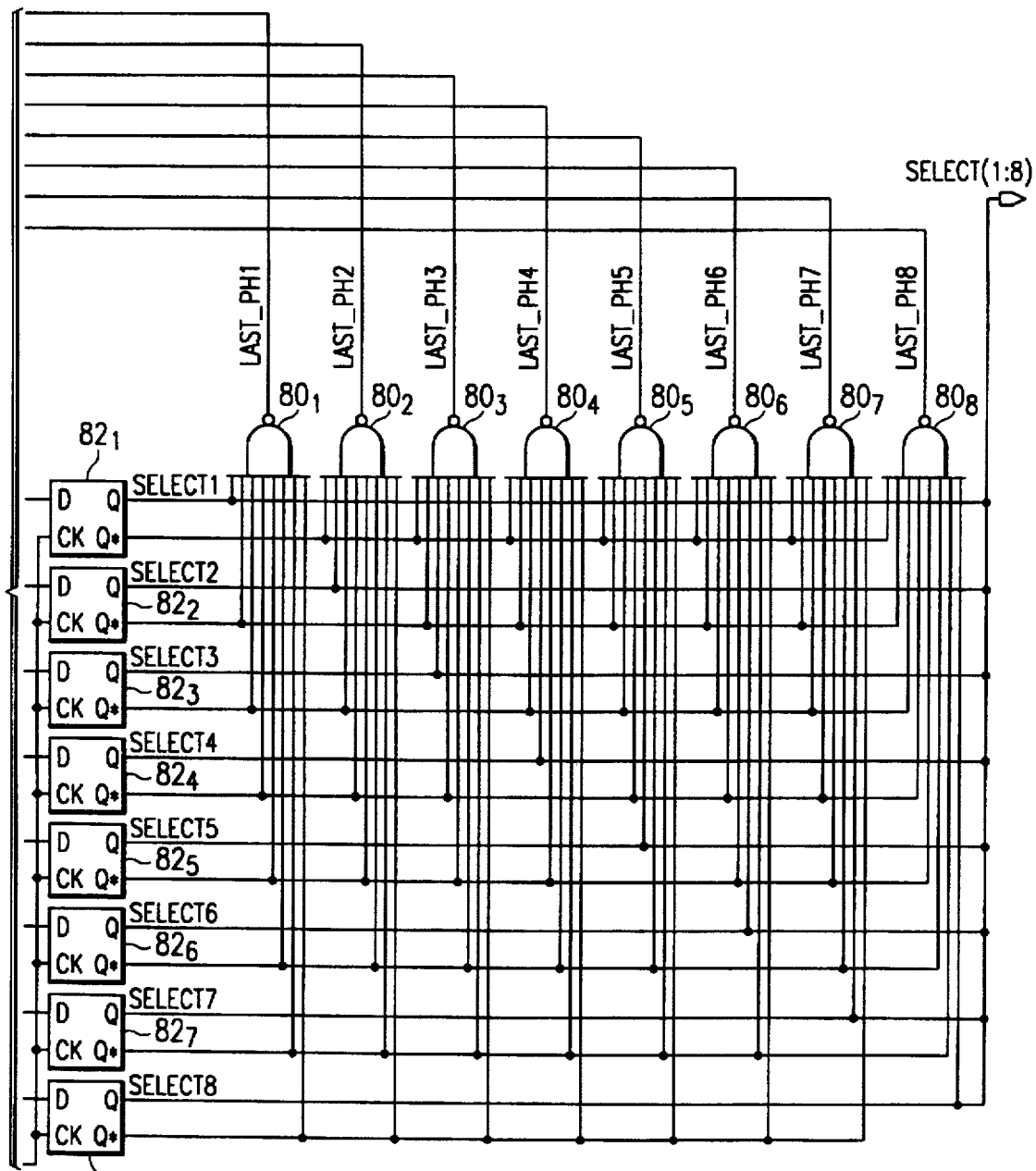

FIG. 9 illustrates a schematic diagram of the compare circuitry 38. The compare circuitry receives the PH(1:8) and PH(1:8)F signals from the hold circuitry 36. NAND gates $78_1$–$78_8$ are coupled to the PH(n) and PH(n)F signals such that the current phase from the hold circuitry 36 can be determined. A table of possible phase information signals is given below in TABLE I.

TABLE I

| Possible Phase Information Signals | |
|---|---|
| PH(1:8) | PH(1:8)F |
| 00000001 | 11111110 |
| 00000010 | 11111101 |
| 00000100 | 11111011 |
| 00001000 | 11110111 |
| 00010000 | 11101111 |
| 00100000 | 11011111 |
| 01000000 | 10111111 |
| 10000000 | 01111111 |

For a given phase, one of the NAND gates $78_1$–$78_8$ will output a "0" while the remaining gates will output a "1". Corresponding NAND gates $80_1$–$80_8$ are coupled to the non-inverted and inverted outputs of flip-flops $82_1$ $82_8$, which are coupled to the PH(1:8) signals and clocked by the CLK1 signal. Hence, the flip-flops $82_1$–$82_8$ store the previous phase information. NAND gates $80_1$–$80_8$ are coupled to the non-inverting and inverting signals of the flip-flops $82_1$–$82_8$ in the same manner that NAND gates $78_1$–$78_8$ are coupled to the PH(1:8) and PH(1:8)F signals. The non-inverted outputs of the flip-flops $82_1$–$82_8$ comprise the SELECT(1:8) signals.

The outputs of respective NAND gates $78_1$–$78_8$ and $80_1$–$80_8$ are coupled to OR gates $84_1$–$84_8$. Hence, OR gate $84_1$ has the output of NAND gate $78_1$ and the output of NAND gate $80_1$ as its inputs and OR gate $84_2$ has the outputs of NAND gates $78_8$ and $80_2$ as its inputs. The outputs of OR gates $84_1$–$84_8$ are coupled to the inputs of NAND gate 86. The output of NAND gate 86 comprises the COUNT_RSTF signal. The output of COUNT_RSTF signal indicates whether the phase information output from the hold circuitry 36 on a current cycle is the same as the phase information output from the hold circuitry 36 on the previous clock cycle (using CLK1 as the reference). If the phase information is the same, then the inputs to one of the OR gates $84_1$–$84_8$ will both be a logic "0", thereby causing the COUNT_RSTF to be a logic "1". On the other hand, if the phase information has changed from one clock period to the next, none of the OR gates $84_1$–$84_8$ will have both inputs set to a logic "0" and therefore, COUNT_RSTF will transition to a logic "0".

The purpose of the compare circuitry 38 is to insure that the phase information from the hold circuitry is valid and not just a transient which has resulted from a metastable anomaly. Hence, the COUNT_RSTF signal indicates when there is a change in phase. This information is received by the counter circuitry 40. The last phase information (SELECT(1:8)) is sent to the PCS circuitry 42.

Figure 10:
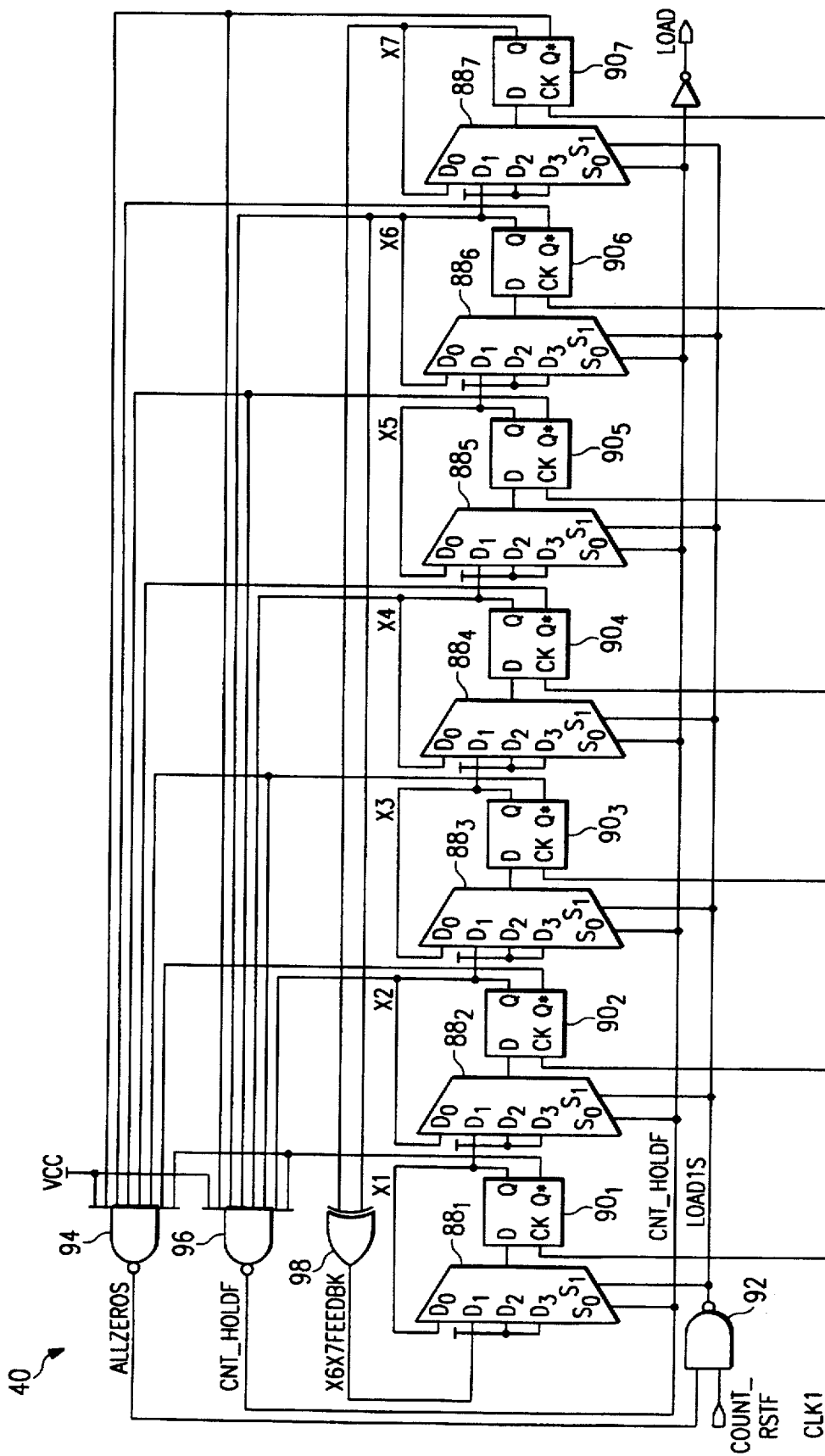
FIG. 10 illustrates a schematic representation of counter circuitry used in the clock recovery circuitry of FIG. 4.

FIG. 10 illustrates a schematic diagram of the counter circuitry 40. The counter circuitry 40 receives the CLK1 signal and the COUNT_RSTF from the compare circuitry 38 on FIG. 9. The counter circuitry 40 outputs a LOAD signal which is the inverted CNT_HOLDF signal. In the embodiment shown in FIG. 10, the counter is a linear feedback shift register counter, although other types of counters would be equally suitable. The counter circuitry 40 comprises 7 pairs of respective multiplexers $88_1$–$88_7$ and flip flops $90_1$–$90_7$. Each multiplexer $88_1$–$88_7$ receives the LOAD1S control signal as an input to one of its select inputs. The LOAD1S signal is the output of a NAND gate 92 having the COUNT_RSTF and ALLZEROS control signals as inputs. The ALLZEROS control signal is the output of NAND gate 94. The second select input of the multiplexers $88_1$–$88_7$ is coupled to the CNT_HOLDF signal, Which is the output of NAND gate 96 (the HOLD signal is the inverted CNT_HOLDF signal). Each multiplexer has a first input coupled to the output of its associated flip-flop (i.e., multiplexer $88_1$ receives the output of flip-flop $90_1$ as its first input and multiplexer $88_2$ receives the output of flip-flop $90_2$ as its first input). The second input to multiplexor $88_1$ is coupled to the X6X7FEEDBK control signal, which is the output of exclusive-OR Gate 98. The remaining multiplexers $88_2$–$88_7$ receive the non-inverted output of the preceding flip-flop as their second input. In other words multiplexer $88_2$ receives the non-inverted output of flip-flop $90_1$ and multiplexer $88_3$ receives the non-inverted output of flip-flop $90_2$ as its second input. The third and fourth inputs to the multiplexers $88_1$–$88_7$ are coupled to a logical high signal. Each flip-flop $90_1$–$90_7$ is clocked by the CLK1 signal and receives as its input the output of its associated multiplexer. Hence, flip-flop $90_1$ receives the output of multiplexer $88_1$. NAND gate 94 receives the inverted output of each flip-flop $90_1$–$90_7$. The eighth input to NAND gate 94 is coupled to electrical high signal. NAND gate 96 is coupled to either the inverted or non-inverted outputs of the flip-flops $90_1$–$90_7$. The configuration of inputs to NAND gate 96 determines the value up to which the counter circuitry 40 will count. Exclusive OR gate 98 is coupled to the non-inverted outputs of flip-flops $90_6$ and $90_7$.

In operation, the counter 40 has 128 unique states, with the state "0000000" being an illegal state. If counter assumes the illegal state, the ALLZEROS control signal will transition to a logical low, thereby driving the LOAD1S signal high, which will reset the counter to the state "1111111". Similarly, if the COUNT_RSTF signal is a logical "0", the LOAD1S control signal will transition to a logical "1" which will again reset the state of the counter to "1111111". Otherwise, while COUNT_RSTF is a logical "0" the counter will continue to count responsive to the CLK1 signal until the inputs to NAND gate 96 cause the CNT_HOLDF signal to transition to a logical "0" When CNT_HOLDF is a logical "0" the noninverting output of the flip-flops $90_1$–$90_7$ will pass through the respective multiplexers $88_1$–$88_7$ until the COUNT_RSTF transitions to a logical "0", indicating a new phase.

The purpose of the counter circuitry 40 is to count the number of consecutive phase matches and output a LOAD indication when a predetermined number of matches have occurred. This insures that the current phase information is not just a transient which has resulted from a metastable-anomaly. In general, the counter circuitry 40 increments every time COUNT_RSTF is a logical "1" If COUNT-RSTF is a logical "0" the counter is reset to the initial condition. If n matches occur, where n is a predetermined number of matches chosen to indicate the current phase information is not transient, the LOAD output of the counter circuitry 40 is activated to a logic "1". The output will remain at logic "1" as long as the counter continues to receive the same phased information. The value of n is based on the expected frequency offset between the data and phased clocks.

Figure 11:
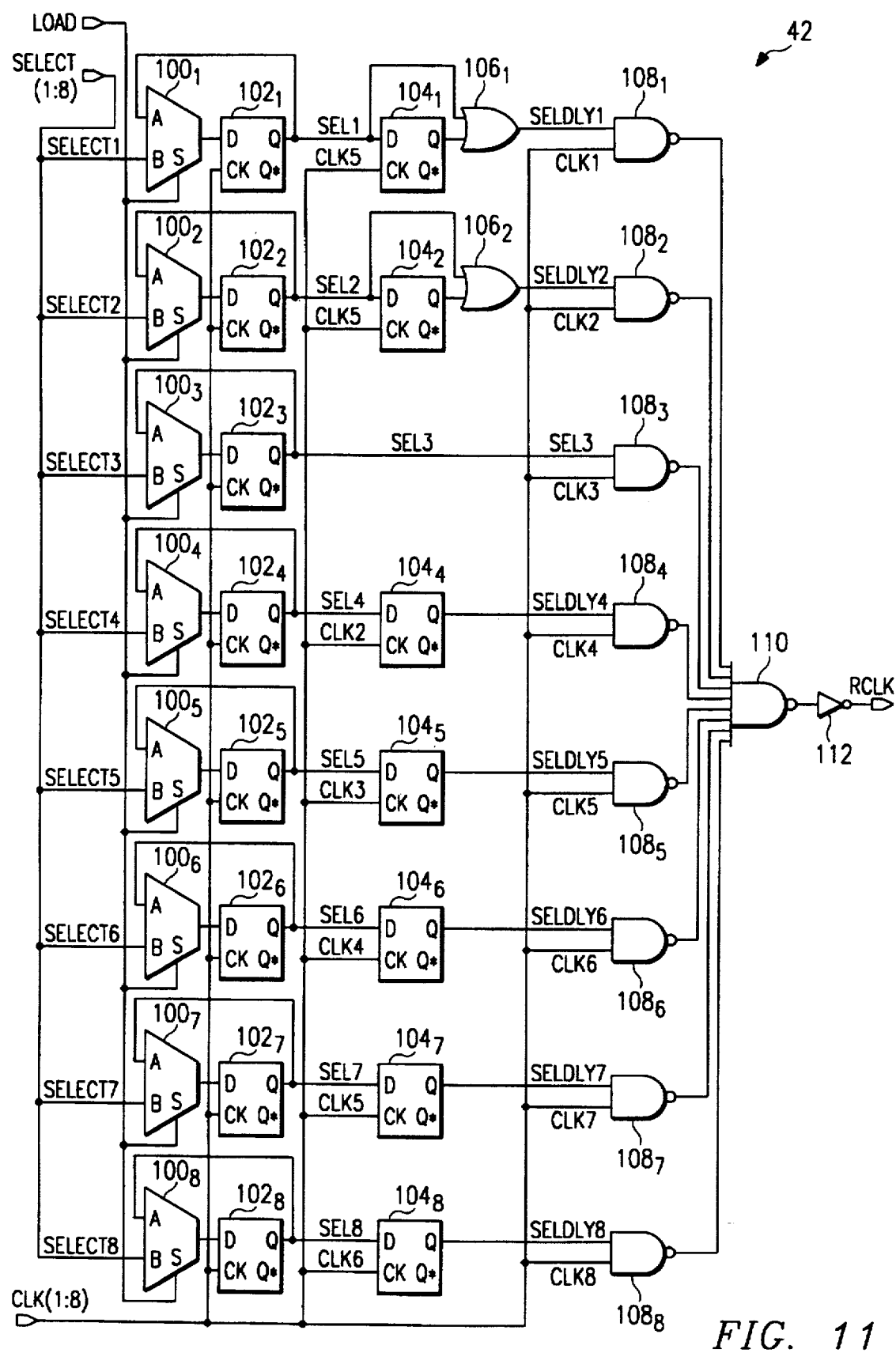
FIG. 11 illustrates a schematic representation of the PCS circuity used in the clock recovery circuitry of FIG. 4.

FIG. 11 illustrates a schematic diagram of the PCS circuitry 42. The purpose of the PCS circuitry 42 is to use the phase information from the compare block 38 in order to select one of the phased clocks (CLK1-CLK8) as the recovered clock without the generation of glitches during transitions between phased clocks.

The select signals (SELECT1-SELECT8) are received from the compare circuitry 38 and are coupled to one input of respected multiplexers $100_1$–$100_8$. The LOAD signal from the counter circuitry 40 is coupled to the selector input to each of the multiplexers. The outputs of multiplexers $100_1$–$100_8$ are coupled to the input of respective flip-flops $102_1$–$102_8$. The non-inverted outputs of flip-flops $102_1$–$102_8$ are coupled to the other input of respective multiplexers $100_1$–$100_8$. Flip-flops $102_1$–$102_8$ are clocked by the CLK1 signal. The non-inverted outputs of flip-flops $102_1$–$102_8$ are also coupled to the input of a respective flip-flop $104_1$–$104_8$, although there is no respective flip-flop $104_3$ corresponding to flip-flop $102_3$). Flip-flops $104_1$ and $104_2$ are clocked using the CLK5 signal, flip-flop $104_4$ is clocked using the CLK2 signal, flip-flop $104_5$ is clocked using the CLK3 signal, flip-flop $104_6$ is-clocked using the CLK4 signal, flip-flop $104_7$ is clocked using the CLK5 signal and flip-flop $104_8$ is clocked using the CLK6 signal. The non-inverted output of flip-flop $104_1$ is coupled to OR gate $106_1$ which has as its other input the non-inverted output of flip-flop $102_1$. Similarly, OR gate $106_2$ is coupled to the non-inverted output of flip-flops $102_2$ and the non-inverted output of flip-flop $104_2$. NAND gate $108_1$ receives as its input the output of OR gate $106_1$ and the CLK1 signal. NAND gate $108_2$ receives the output of OR gate $106_2$ and the CLK2 signal. NAND gate $108_3$ receives as its inputs the non-inverted output of flip-flop $102_3$ and the CLK3 signal. NAND gate $108_4$ receives as its inputs the non-inverted output of flip-flop $104_4$ and the CLK4 signal. NAND gate $108_5$ receives its input the output of flip-flop $104_5$ and the CLK5 signal. NAND gate $108_6$ receives its inputs the non-inverted output of flip-flop $104_6$ and the CLK6 signal. NAND gate $108_7$ receives its inputs the noninverted output of flip-flop $104_7$ and the CLK7 signal. NAND gate $108_8$ receives its inputs the non-inverted output of flip-flop $104_8$ and the CLK8 signal. The outputs of NAND gates $108_1$–$108_8$ are coupled to the inputs of NAND gate 110. The output of NAND gate 110 is coupled to inverter 112. The output of inverter 112 is the RCLK signal.

In operation, of the PCS circuitry 42 accepts and holds new phase information, i.e., the SELECT1 8 signals when the LOAD signal is a logic "1". The phase information, stored in flip-flops $102_1$–$102_8$ is used to select one of the phased clocks as the recovered clock. The stored phase information is skewed using an associated phase clock, such that the phase information is retimed with a phased clock that rises during the time when the phase clock to be selected as the recovered clock is low. For example, the SEL4 signal, which is the non-inverted output of flip-flop $102_4$, is skewed using CLK2. The CLK2 signal will transition high at a point where the CLK4 signal is low. This prevents the creation of any small pulses, or glitches, which could give false readings when used to retime the data.

This concept of skewing the phase of information works for all but the first two phase positions, i.e., CLK1 and CLK2. These exceptions occur because the phase information that cannot be retimed when the phased clock (CLK1 or CLK2) to be selected as a recovered clock is low. In these cases, the respective OR gate $106_1$ or $106_2$ allows the low-to-high transition of the phase information output from the respective flip-flop $102_1$ or $102_2$ to have an immediate effect while the high to low transition of the phase information is delayed by half a bit period. The net result of the skewing operation is that one of the phase clocks is glitchlessly selected as the output from the PCS circuitry 42 as the recovered clock.

Figure 12:
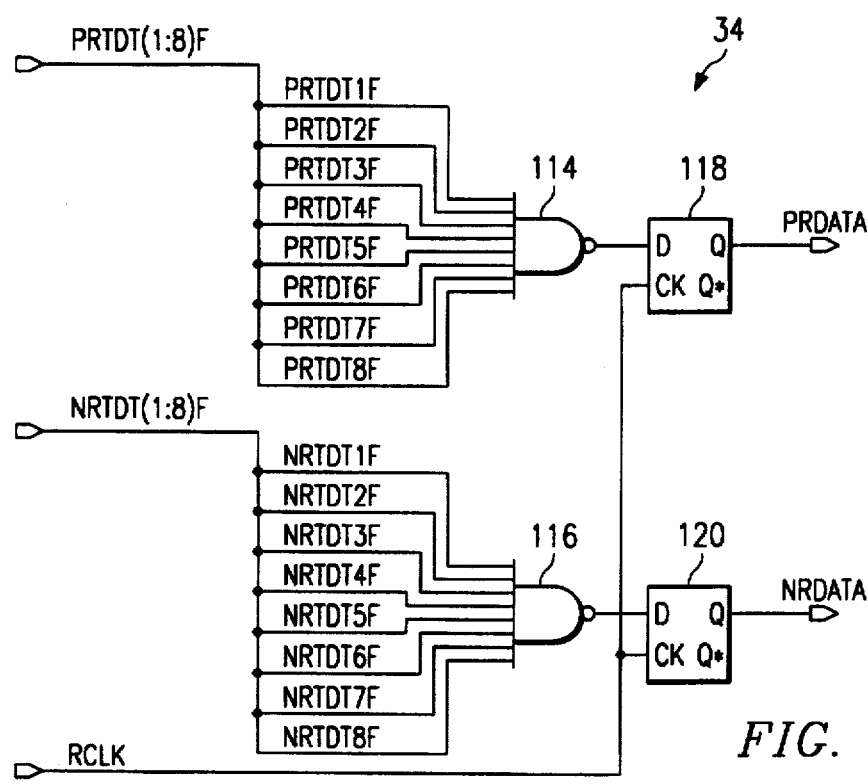
FIG. 12 illustrates a schematic representation of the data retime circuitry used in clock recovery circuitry of FIG. 4.

The data retime circuitry 34 is shown in FIG. 12. The retime circuitry 34 receives the PRTDT(1:8)F data from the P_DET circuitry 30 and the NRTDT(1:8)F data from N_DET circuitry 32. This data is retimed using the recovered clock (RCLK) signal from the PCS circuitry 42. The PRTDT1F-PRTDT8F signals are all input to NAND gate 114. Referring then to FIG. 6, only one of the PRTDT(1:8)F signals may be low at any one time; hence the output of NAND gate 114 is the retimed PDT signal in NRZ format. Similarly, the eight NRTDT(1:8)F signals are input to NAND gate 116 resulting in an NRZ output of the retimed NDT signal. The output of NAND gates 114 and 116 are retimed with the RCLK signal from PCS circuitry 42, using flip-flops 118 and 120, respectively. The output of flip-flop 118 is the PRDATA signal, which is the retimed NRZ equivalent of the PDT signal. The output of flip-flop 120 is the NRDATA signal, which is the retimed NRZ equivalent of the NDT signal. The PRDATA and NRDATA signals may be combined for a unitary signal or maintained separately.

Figure 14:
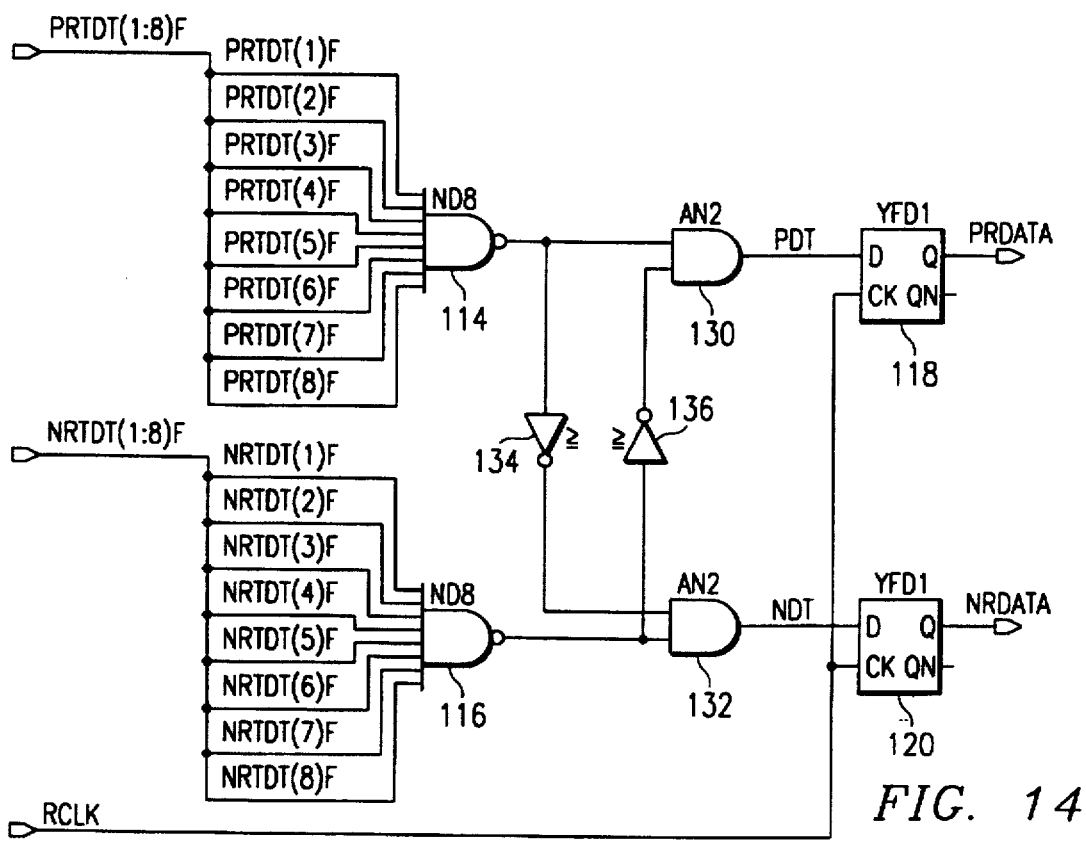
FIG. 14 illustrates an alternative embodiment for the data retime circuitry of FIG. 12.
Figure 13B:
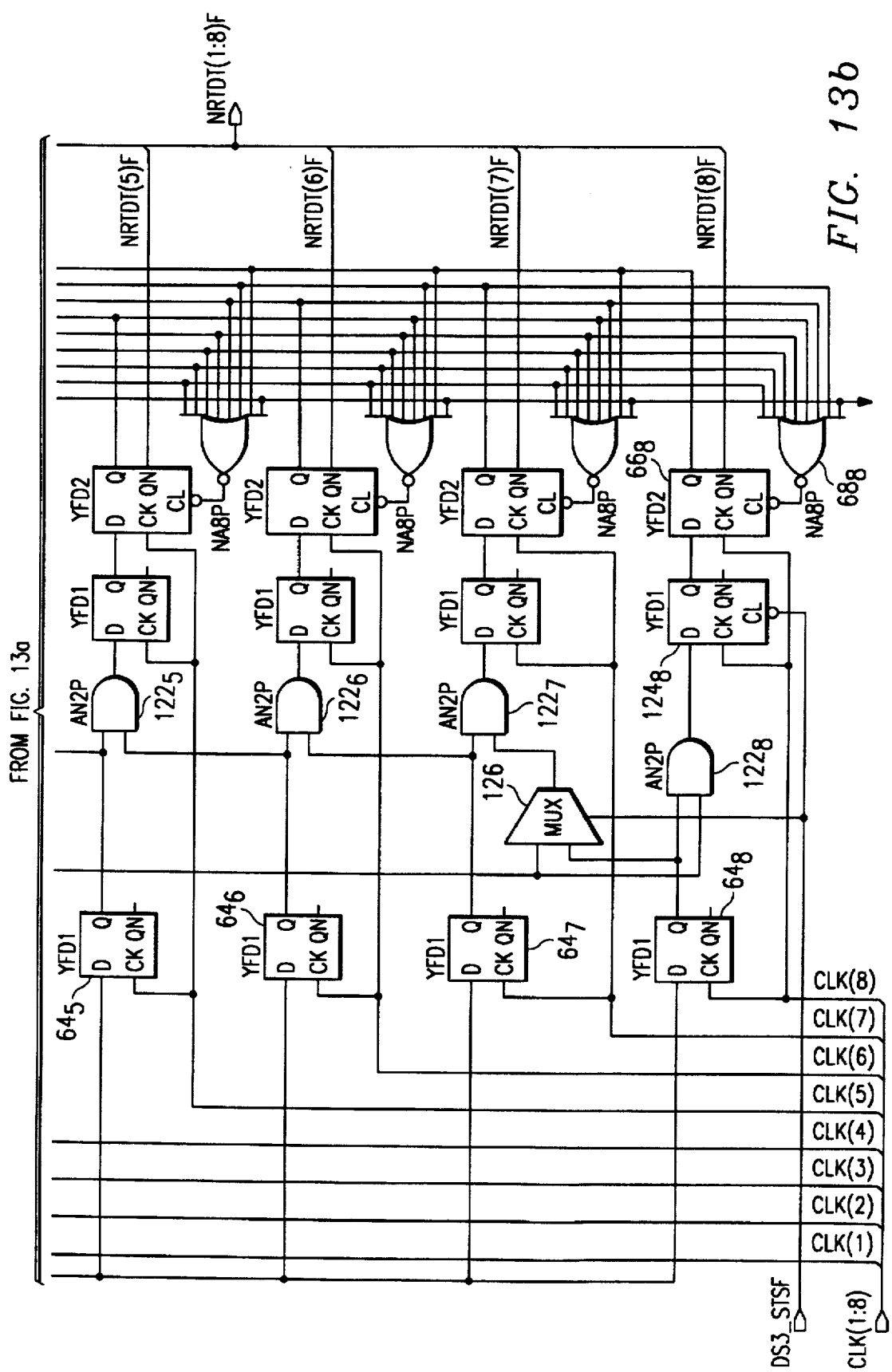

FIGS. 13 and 14 illustrate alternative embodiments which can be used for increased transient and under/overshoot problems, respectively. FIG. 13 illustrates circuit for the N_DET circuit 32 of FIG. 7, which requires that a pulse be present at a logical high level for at least two successive phased clocks in order to enable the NRTDT signal. In this embodiment, pairs of flip-flops 64, which are clocked by successive clock signals, are coupled to the inputs of a respective AND gate. Hence, the outputs of flip-flops $64_1$ and $64_2$ are coupled to AND gate $122_1$, the outputs of flip-flops $64_2$ and $64_3$ are coupled to the inputs of AND gate $122_2$ and the outputs of flip-flops $64_3$ and $64_4$ are coupled to the inputs of AND gate $122_3$. The output of AND gates $122_1$–$122_8$ are coupled to the input of respective flip-flops $124_1$–$124_8$. Each flip-flop 124 is coupled to a respective clock signal CLK1-CLK8. The outputs of flip-flops $124_1$–$124_8$ are coupled to the inputs of respective flip-flops $66_1$–$66_8$. A multiplexer 126 receives the outputs of flip-flops $64_7$ and $64_8$ and passes one of the inputs to AND gate $122_7$ responsive to the DS3 _STSF signal. The remainder of the circuitry is the same as that shown in FIG. 7.

In operation, an AND gate 122 is enabled only if a logical high voltage is detected by two successive flip-flops 64. Thus, to enable AND gate $122_1$, the noninverted outputs of flip-flops $64_1$ and $64_2$ must both detect a logical high on the NDT signal in order for AND gate $122_1$ to output a logical high signal to flip-flop $124_1$. Since flip-flops $64_1$ and $64_2$ are clocked on CLK1 and CLK2, respectively, the-logical high signal on NDT must be at a logical high for at least two successive phased clocks in order for a logical high to be output from flip-flop $66_1$. Consequently, a transient with a width less than the difference between two successive clocks will not register as a logical high signal on NDT.

Multiplexer 126 switches the input to AND gate $122_7$ such that the output of flip-flop $64_1$ is coupled to the second input of AND gate $122_7$ when seven phased clocks are used and the output of flip-flop $64_8$ is coupled to AND gate $122_7$ when eight phased clocks are used.

While the above transient-protection circuitry is described in relation to the N_DET circuitry 32, similar circuitry could be used for the P_DET circuitry 30 to prevent transients from effecting the proper detection of signals.

FIG. 14 illustrates an alternative embodiment of circuitry to prevent under/over-shoots on the PDT and NDT signals which result as false data at the output of the data retime circuit 34. The circuit of FIG. 14 is similar to the circuit of FIG. 12, with the exception that the outputs of NAND gates 114 and 116 are coupled to respective AND gates 130 and 132, respectively. Further, the output of NAND gate 114 is coupled to the input of inverter 134, the output of which is coupled to the second input of AND gate 132. The output of NAND gate 116 is coupled to the input of inverter 136, the output of which is coupled to the second input of AND gate 130. The output of AND gate 130 is coupled to the input of flip-flop 118 and the output of AND gate 132 is coupled to the input of flip-flop 120. The effect of the AND gates 130 and 132 and inverters 134 and 136 is to prevent the PR data output and the NR data output to be simultaneously in a high logic state. When the output of NAND gate 114 is high, the output of inverter 134 is driven low, thereby driving the output of AND gate 132 low. Similarly, when the output of AND gate 116 is logical high, the output of inverter 136 is logical low, thereby driving AND gate 130 low.

The present invention provides advantages over the prior art. Importantly, the clock recovery system has the ability to adjust to phase and frequency differences whereas most clock recovery schemes that recover a clock from a data stream have only phase detection capabilities. The circuitry can recover a clock from a data stream whose frequency varies widely relative to the frequency of the phased clocks and can be adapted to almost any frequency by changing the choice of delays and reference frequencies. The clock can be recovered from NRZ data and RZ data and can convert positive and negative RZ data into positive and negative NRZ data. Further, the circuitry can recover a clock from two different data frequencies, such as DS3 and STS-1 using a single multitap delay line.

Although the Detailed Description of the Preferred Embodiment has been directed to certain exemplary embodiments, various modifications of the embodiments, as well as alternative embodiments would be known to those skilled in the art. For example, different logic configurations could be used to perform the same functions as the logic described throughout. The inverter encompasses any modifications or alternative embodiments that fall within the scope of the claims.

What is claimed is:

1. Data recovery circuitry for generating a recovered data signal from an RZ data stream comprising:

circuitry for recovering a clock signal from said RZ data stream;

circuitry for translating said RZ data stream to an NRZ data stream prior to any retime operation on the RZ data stream, wherein said circuitry for translating comprises:

circuitry for generating a plurality of phased clocks;

circuitry for translating said RZ data stream to an NRZ data stream by sampling the RZ data stream responsive to said phased clocks to determine a first of said plurality of phased clocks to sample a predetermined logic level in said RZ data stream and for generating signals for respective of said phased clocks indicating whether the respective clock was the first to sample said predetermined logic level on its last active edge; and circuitry for retiming the NRZ data stream with the recovered clock signal from said RZ data stream.

2. The data recovery circuitry of claim 1 and further comprising logic circuitry for combining said signals to generate a single NRZ signal.

3. The data recovery circuitry of claim 2 wherein said logic circuitry is a NAND gate.

4. The data recovery circuitry of claim 1 wherein said circuitry for recovering a clock comprises circuitry for recovering a clock responsive to said sampling circuitry.

5. The data recovery circuitry of claim 4 wherein said circuitry for recovering the clock comprises circuitry for dynamically selecting one of said phased clocks as the recovered clock response to said sampling circuitry.

6. A method of recovering data from an RZ data stream comprising:

recovering a clock signal from said RZ data stream;

translating said RZ data stream to an NRZ data stream prior to any retime operation on the RZ data stream, wherein said translating step comprises:

generating a plurality of phased clocks;

sampling the RZ data stream responsive to said phased clocks to translate said RZ data stream to NRZ data stream and to determine a first of said clocks to sample a predetermined logic level in said RZ data stream; and generating signals for respective of said phased clocks indicating whether the respective clock was the first to sample said predetermined logic level on its last active edge; and retiming the NRZ data stream with the recovered clock signal from said RZ data stream.

7. The method of claim 6 and further comprising the step of combining said signals to generate a single NRZ signal.

8. The method of claim 7 wherein said combining step comprises the step of performing a NAND operation on said signals.

9. The method of claim 6 wherein said clock recovering step is performed responsive to said sampling circuitry.

10. The data recovery circuitry of claim 9 wherein said clock recovering step comprises the step of dynamically selecting one of said phased clocks as the recovered clock.

11. A data recovery circuit for generating a recovered data signal from an RZ data stream comprising:

a circuit for sampling said RZ data stream responsive to a plurality of phased clock signals, comprising:

circuitry for generating signals for respective of said plurality of phased clock signals indicating whether the phased clock signal was a first to sample a predetermined logic level in said RZ data stream;

circuitry for selecting a recovered clock signal for said RZ data stream from the first of said plurality of phased clock signals to sample said predetermined logic level in said RZ data stream; and circuitry for translating said RZ data stream sampled into an NRZ data stream responsive to said first phased signal to sample said predetermined logic level in said RZ data stream, prior to any retime operation on the RZ data stream; and circuitry for retiming said NRZ data stream with said recovered clock signal for said RZ data stream to generate the recovered data signal from said RZ data stream.

12. The data recovery circuit of claim 11 further comprising circuitry for generating a plurality of phased clock signals.

13. The data recovery circuit of claim 11 wherein said circuitry for translating said RZ data stream sampled responsive to said recovered clock signal into an NRZ data stream comprises logic circuitry for combining said signals for respective of said plurality of phased clock signals indicating whether the phased clock signal was the first to sample said predetermined logic level in said RZ data stream to generate a single NRZ signal from said RZ data stream sampled by the first phased clock to sample a predetermined logic level in said RZ data.

14. A method of recovering a data signal from an RZ data stream comprising:

sampling said RZ data stream responsive to a plurality of phased signals;

selecting a recovered clock signal for said RZ data stream from a first one of said plurality of phased clock signals to sample a predetermined logic level in said RZ data stream, wherein said selecting seep further comprises generating signals for respective of said plurality of phased clock signals indicating whether the phased clock signal was the first to sample said predetermined logic level in said RZ data stream;

translating said RZ data stream sampled into an NRZ data stream responsive to said first phased clock signal to sample a predetermined logic level in said RZ data stream, prior to any retime operation on the RZ data stream; and retiming said NRZ data stream with said recovered clock signal for said RZ data stream.

15. The method of claim 14 further comprising the step of generating a plurality of phased clock signals.

16. The method of claim 14 wherein said translating step comprises:

generating a select signal by combining said signals for respective of said plurality of phased clock signals indicating whether the phased clock signal was the first to sample said predetermined logic level in said RZ data stream; and generating a single NRZ signal from said RZ data stream in response to said select signal.

* * * * *

UNITED STATES PATENT AND TRADEMARK OFFICE
CERTIFICATE OF CORRECTION

PATENT NO. : 5,689,530
DATED : November 18, 1997
INVENTOR(S) : Honaker, Jr.

It is certified that error appears in the above-indentified patent and that said Letters Patent is hereby corrected as shown below:

Col. 1, ln. 50, delete "First,.in", insert -- First, in --.

Col. 1, ln. 60, delete "imprecision of a", insert -- imprecision of an --.

Col. 2, ln. 17, delete "Characteristics", insert -- characteristics --.

Col. 4, ln. 57, delete "flip-flops $44_1 44_8$", insert -- flip-flops $44_1$-$44_8$ --.

Col. 5, ln. 20, delete "$46_1$, is", insert -- $46_1$, as --.

Col. 5, ln. 28, delete "again to.", insert -- again to --.

Col. 5, ln. 29, delete "value 53 on", insert -- value on --.

Col. 5, ln. 38, delete "high 59 on", insert -- high on --.

Col. 5, ln. 42, delete "DS3 STSF", insert -- DS3_STSF --.

Col. 5, ln. 48, delete "and a STS-1", insert -- and an STS-1 --.

Col. 6, ln. 45, delete "flip-flop 701", insert -- flip-flop $70_1$ --.

Col. 6, ln. 46, delete "flip-flop 702", insert -- flip-flop $70_2$ --,

Col. 7, ln. 11, delete "logic ″0″", insert -- logic "0" --.

Col. 7, ln. 41, delete "$82_1$ $82_8$", insert -- $82_1$-$82_8$ --.

Col. 8, ln. 20, delete "COUNT RSTF", insert -- COUNT_RSTF --.

UNITED STATES PATENT AND TRADEMARK OFFICE
CERTIFICATE OF CORRECTION

PATENT NO. : 5,689,530
DATED : November 18, 1997
INVENTOR(S) : Honaker, Jr.

It is certified that error appears in the above-indentified patent and that said Letters Patent is hereby corrected as shown below:

Col. 8, ln. 24, delete "signal, Which", insert -- signal, which --.

Col. 8, ln. 60, delete "logical "0" When", insert -- logical "0". When --.

Col. 9, ln. 2-3, delete "metastable-anomaly", insert -- metastable anomaly --.

Col. 9, ln. 4, delete "logical "1" If", insert -- logical "1". If --.

Col. 10, ln. 65, delete "the-logical", insert -- the logical --.

Col. 14, ln. 1, delete "selecting seep", insert -- selecting step --.

Col. 14, ln. 7, delete "stream responsive", insert -- stream respective --.

Signed and Sealed this

Seventh Day of April, 1998

Attest:

BRUCE LEHMAN

*Attesting Officer*       *Commissioner of Patents and Trademarks*